United States Patent

Leadbeater

[15] 3,701,009
[45] Oct. 24, 1972

[54] ELECTROMECHANICAL TRANSDUCER

[72] Inventor: Douglas Albert Leadbeater, Cromer, England

[73] Assignee: George Salter & Co., Ltd., Straffordshire, England

[22] Filed: Dec. 5, 1969

[21] Appl. No.: 882,557

[52] U.S. Cl. ............324/61 P, 317/249, 324/61 QS
[51] Int. Cl. .........................G01r 27/26, H01g 5/00
[58] Field of Search..........324/61; 73/105; 33/174 L; 340/200, 282; 317/249

[56] References Cited

UNITED STATES PATENTS

| 3,566,222 | 2/1971 | Wolfendale | 317/249 |
| 2,204,196 | 6/1940 | Straatman | 324/1 |
| 2,288,838 | 7/1942 | Pike et al. | 317/246 X |
| 2,387,496 | 10/1945 | Cornelius | 177/351 |
| 2,512,879 | 6/1950 | Roggenstein | 175/41.5 |
| 2,806,204 | 9/1957 | Rothacker | 324/61 |
| 3,213,360 | 9/1965 | Cook et al. | 324/61 |
| 3,426,272 | 2/1969 | Griffin | 324/61 |

*Primary Examiner*—Alfred E. Smith
*Attorney*—Richards & Geier

[57] ABSTRACT

An electromechanical transducer, especially suitable for use with weighing apparatus for precision measurements, includes an oscillator providing an output of which the frequency is controlled by extent of displacement of a movable sensing member, and has fine adjustment means for setting the precise functional relationship between the change in output frequency and extent of displacement of the sensing member.

9 Claims, 8 Drawing Figures

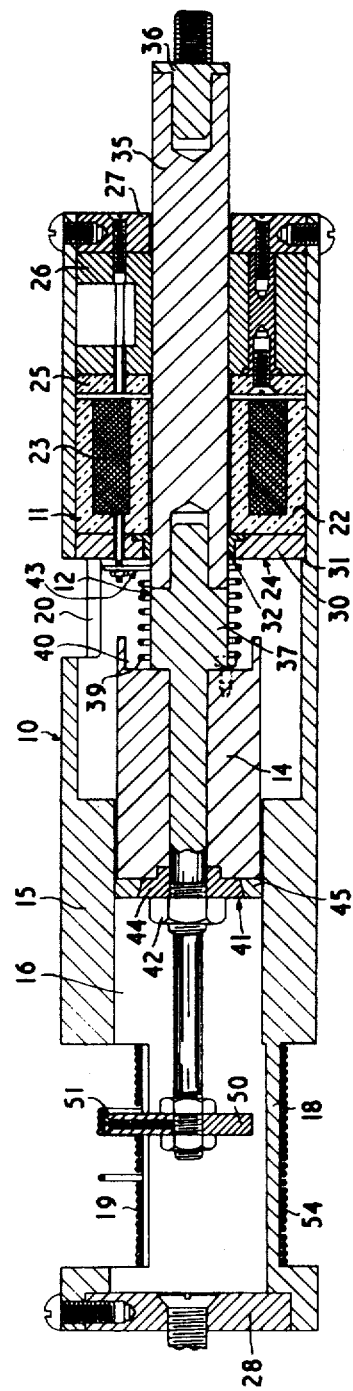

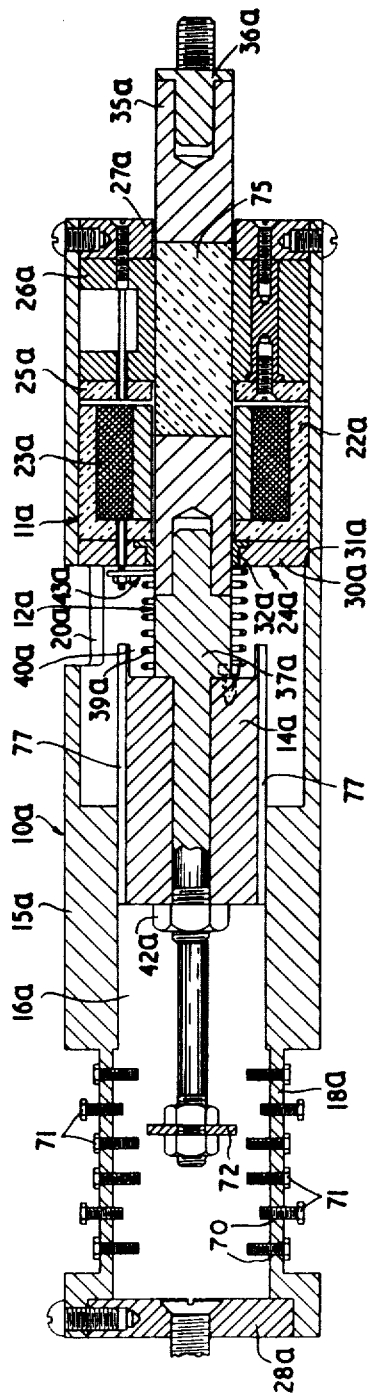
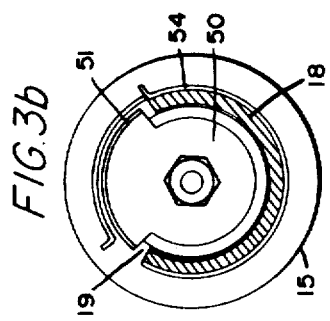

INVENTOR:
D.A. Leadbeater
By
Richards & Geier
ATTORNEYS

INVENTOR:
D. A. Leadbeater
By Richards & Geier
ATTORNEYS

ELECTROMECHANICAL TRANSDUCER

This invention relates to means for, and a method of measuring or detecting mechanical displacements by producing an electrical quantity having characteristics representative of the extent of said displacements.

The invention may be applied for many different purposes, such as for the remote recording of mechanical movement and control of operations dependent thereon, and one especially useful application is in connection with weighing devices or weighing apparatus to enable information relative to displacements of movable load-responsive means therein to be transmitted to a remotely positioned load indicator or automatic control means for example.

The invention is based broadly on the concept of providing or using an electromechanical transducer device giving an electrical signal of periodic form wherein units of length are represented by units of electrical oscillation frequency.

More particularly, the invention provides a method of measuring or detecting rectilinear mechanical displacements of a movable member wherein an electromechanical transducer device is provided having a rectilinearly movable mechanical detector or sensing element which is operatively arranged to be displaced in correspondence with said movable member, the transducer device being adapted to provide an electrical output of periodic form of which the frequency is dependent upon and is determined by the positioning of said detector or sensing element which controls the reactance of a tuned circuit producing said electrical output whereby displacements of the latter cause corresponding changes in frequency of said electrical output, and wherein said electrical output of the transducer device is fed to and processed by a frequency measuring and indicating means.

The invention also provides means for carrying out the method of measuring or detecting rectilinear mechanical displacements of a movable member as set forth above, said means comprising the electromechanical transducer device wherein the movable mechanical detector or sensing element is guided for rectilinear movement and includes or carries an operative part of a variable capacitive and or inductive element of the electrical oscillatory tuned circuit which produces the electrical output of said transducer device.

Thus, the transducer device can comprise a movable mechanical detector or sensing member controlling essentially a variable oscillatory circuit which is included in any of the electronic circuitries associated with the names of Hartley, Colpitts or Franklin.

The variation in the oscillatory circuit is similar to tuning in its accepted sense in the radio communications field, and is regulated by the detector or sensing member which is arranged to vary the capacitive reactance and/or the inductive reactance thereof.

The device is adapted to gauge essentially rectilinear displacements, and it can conveniently be designed in several forms. In one form, the detector or sensing member may vary only capacitive reactance by way of adjustment of a variable capacitor element of the oscillator tuned circuit; in a second form, it may vary both capacitive and inductive elements at the same time. In practice, a conventional trimming capacitor will also normally be included for setting the tuned circuit.

In one very satisfactory and convenient construction of the transducer device, the detector or sensing member comprises a plunger which is slidably mounted and guided within a tubular body and which carries a substantially cylindrical slug forming the inner electrode of a variable cylindrical capacitor of which the other or outer electrode is formed by a co-axial cylindrical portion of the body. In this preferred construction, the body also carries, co-axially with the plunger, an inductance coil which may be enclosed within a screened dust iron sleeve to form a self-contained assembly unit and which together with the cylindrical variable capacitor makes up the tuned circuit of the oscillator. A conventional trimming capacitor and the remaining principal components of the oscillator circuit are also preferably mounted as a compact assembly in close proximity on the body.

A portion at least of the plunger may be composed of a compacted and sintered siliceous insulating material, such as the material sold under the registered trade mark "Arclex," having a low coefficient of thermal expansion, and is accurately guided by low friction bearing surfaces.

If it is desired to vary the inductance at the same time as the capacitance is varied, a center portion of the insulated section of the plunger can be made of dust iron.

The free outer end of the plunger can project beyond the body and be adapted for connection or coupling to a part whose displacement it is desired to measure or gauge.

The substantially cylindrical slug is then conveniently carried by the opposite or inner end of the plunger and is also accurately guided within the bore of the cylindrical outer electrode portion of the cylindrical capacitor by insulating guide surfaces preferably composed of a low friction insulating material such as, for example, polytetrafluorethylene (P.T.F.E.).

With the above described construction, the transducer device may be designed so that the changes in frequency are directly proportional to the extent of displacement of the plunger and a linear relationship exists throughout the entire working range. On the other hand, in some applications, such as when the device is to be utilized to measure displacements in a spring weighing machine under load, wherein the load/deflection characteristics of the springs are not strictly linear, it may be desired to introduce a predetermined degree of non-linearity into the relationship between the frequency changes and displacement over at least a certain portion of the working range. In the example mentioned, it may then be possible to display the measured load reading on a linear scale, the non-linearity of the transducer characteristics being arranged to compensate for the non-linearity of the characteristics of the load-balancing springs of the weighing apparatus.

According to a further preferred feature, the transducer device therefore includes means whereby the relationship of the change in frequency of the electrical output as a function of displacement of the movable detector or sensing member can be varied or adjusted within limits.

For example, in the constructions already described, the variable capacitor electrode formed by the normally stationary body may include an adjustable part which can be set to alter the electrostatic field distribution in the path of movement of a portion of the variable capacitor electrode formed or carried by the movable detector or sensing member. More specifically, the inner end of the plunger may be composed of conducting material and extend beyond the cylindrical slug and, adjacent to a part of the main cylindrical portion of the tubular body forming the outer electrode of the variable capacitor, it may carry a vane of insulating material fitted with an outer membrane of conducting material. Electrical connection by means of a wire is made between this membrane and the extended inner end of the plunger and hence, to the slug so that it also forms part of the inner or movable electrode of the variable condenser. The conducting membrane on the vane is positioned so as to be opposite to an aperture of the outer cylinder so that the capacitance between the vane portion and the outer cylinder is normally of a low or secondary order. If, however, the aperture is obscured by moving a ring of wire across it, then additional capacitance is added to the oscillatory circuit at that point of the displacement corresponding to the lateral position of the extended wire ring, the degree of ring movement or aperture obscurity being in direct relationship to the degree of additional capacitance and resultant change in frequency.

In an alternative arrangement to the rings and vane described above, the vane may be substituted by a small disc of metal and, instead of the aperture, the outer cylinder is provided with a series of screw-carrying radial holes. With the screws withdrawn, the capacitance between the outer cylinder and the metal disc is at a minimum but as the screws are wound inwards the capacitances increases in a manner similar to moving the rings across the aperture, to produce the desired degree and form of asymmetry of the electrostatic field and thereby introduce a controlled degree of non-linearity into the "change in frequency/displacement" characteristics.

In a further construction, the movable mechanical detector or sensing element may comprise a movable plate electrode of a parallel plate capacitor having associated fixed or stationary plate electrodes, the movable plate electrode being carried by parallel blade spring arms or like parallel-motion resilient mounting to guide it for rectilinear movement, and furthermore, the parallel-motion resilient mounting such as the parallel blade spring arms may directly constitute the load-balancing component of a spring weighing apparatus.

By way of example, several forms and arrangements of transducer device in accordance with the present invention will be more particularly described with reference to the accompanying drawings, in which, FIG. 1 is a longitudinal section of the main structure of a first form of transducer device;

FIG. 2 is a view similar to FIG. 1 but showing a modified construction;

FIG. 3b is a section along the line X—X of FIG. 1;

Figure 3:
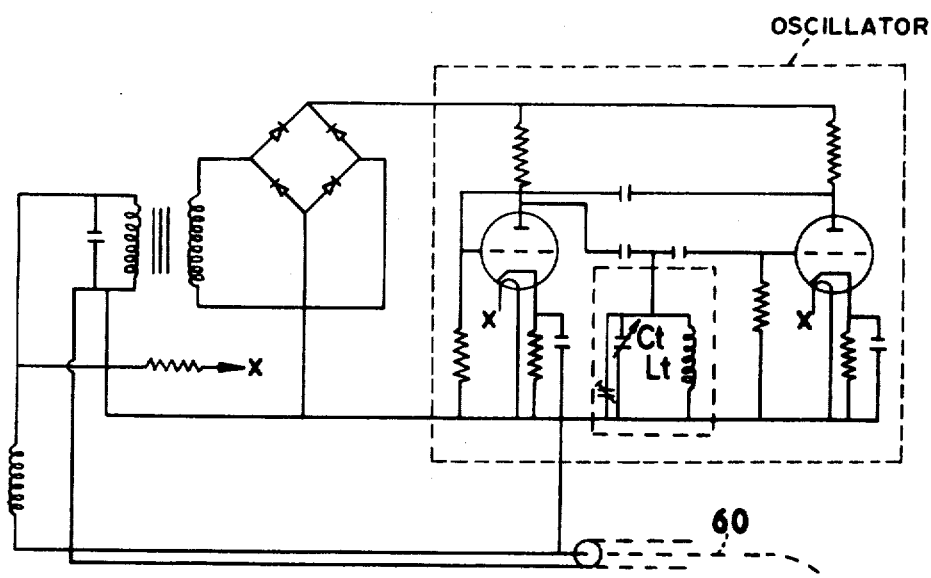
FIG. 3 is a circuit diagram of a typical electrical oscillator circuit of the transducer device.
Figure 3A:
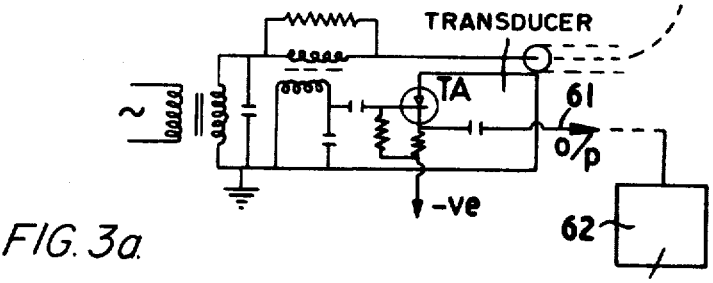
FIG. 3a is a circuit diagram of the capacitor arrangement.

Although several particular constructions of transducer device are shown and described, the construction of the transducer in accordance with the invention may of course comprise a combination of any of the particular features present in any of these specific embodiments.

Referring firstly to FIG. 1, the transducer device illustrated therein comprises a one-piece tubular body 10 of cylindrical form within which is fitted co-axially an inductance coil unit 11 and a central slidable plunger 12 carrying towards its inner end a substantially cylindrical slug 14.

The body 10 is formed from brass tubing and the portion 15 has a relatively thick wall providing an accurately machined cylindrical bore 16.

The adjacent portion 18 has a reduced external diameter and is formed with a large aperture of opening 19. A smaller aperture or opening 20 is also provided in the region adjacent the coil unit 11 which comprises a sleeve member 22 composed of compacted iron dust and having an annular recess in which is contained the windings 23 of the inductance coil. The sleeve member 22 abuts at its inner end a plunger guide member 24 and is retained in position by a closure or spacing plate 25 adjacent a cable clamping sleeve 26 which abuts an end cap 27 of the body. Various means are, of course, available for arranging the external electrical connections.

The opposite end of the body 10 is also fitted with an end cap 28.

In this embodiment, the plunger guide member 24 comprises two parts, an outer disc 30 which locates against a shallow internal shoulder 31 of the body, and an inner central flanged sleeve 32. The disc 30 is advantageously composed of a compacted and sintered siliceous insulating material such as that sold under the trade mark "Arclex," and the sleeve 32 is advantageously composed of a low friction plastics material, such as polytetrafluorethylene (P.T.F.E.), and provides a bearing for supporting and guiding the plunger 12.

The plunger 12 is conveniently made up of three axially aligned cylindrical parts, a cylindrical insulating center part 35, a short outer end part 36 and an elongate conductive inner end part 37.

The center part 35 is again advantageously composed of sintered siliceous insulating material such as the "Arclex" material referred to above which is accurately machined to provide a true cylinder having a close sliding fit in the plunger guide sleeve 32, and the end parts 36 and 37 are machined from brass and are connected to the center part 35 by axial spigot projections which are cemented within bores at the ends of the latter.

The substantially cylindrical slug 14 is mounted on a reduced diameter section of the inner end part 37 of the plunger and comprises a brass cylinder which has a recess 40 at its outer end and which is fitted with a guide member 41 at its inner end. It is held in position on the plunger by clamping nut 42.

The slug guide member 41 comprises an inner annular disc 44, also composed of the aforesaid "Arclex" insulating material, and an outer co-axial annular sleeve 45 retained in position by conical engaging surfaces. The sleeve 45 is formed of low friction polytetrafluorethylene (P.T.F.E.) and its periphery projects slightly above periphery of the main body of the slug 14 so that it forms the sole bearing and contact surface engaging the cylindrical surface of the bore 16 of the body portion 15 and maintains electrical insulation between the latter and the slug.

Electrical connection to the slug 14 is established throughout its range of axial movement by means of a resilient open coil 39 of beryllium copper wire of which one end seats in the recess 40 and is attached to the slug body, whilst the other end 43 completes a flexible lead for connection to the inductance coil windings 23 and to the associated oscillator circuit.

As shown in the drawing, in this embodiment of FIG. 1, the extremity of the conductive inner end part 37 of the plunger which lies within the region of the body aperture or opening 19 is fitted with a vane 50, formed by a disc of the "Arclex" insulating material, upon which is fitted circumferentially a part-annular metal segment or conductive membrane 51 which is positioned opposite to the aperture 19 in the outer cylinder. A series of wire rings 54 is, however, mounted upon the portion 18 of the outer body by means of which the aperture 19 can be selectively partially closed or obscured. The wire rings 54 are apertured, they do not form complete rings but are gapped to make possible axial movement of the vane 50. By moving the rings 54, the distribution of the electrostatic field can be controlled, and the capacitance can thereby be altered at different points throughout the range of displacement of the plunger, thereby providing a fine control of the linearity of the transducer characteristics.

FIG. 3 indicates a typical form of electronic circuit associated with the device, comprising a high stability oscillator operative preferably in the region of several megacycles having a tuned circuit made up of variable capacitor $C_t$ and inductance $L_t$ which represent respectively the cylindrical capacitor formed by the body portion 15 together with slug 14, and the inductance coil windings 23 of the transducer. The components of the oscillator circuit are all conveniently carried in close proximity by a mounting plate (not shown) or the like attached directly to the exterior of the transducer body 10, and the output is fed through a screened cable 60 and via amplifier TA to a remotely-positioned counter, recording and display unit or the like, indicated at 62, which is responsive to the frequency of the transmitted signal.

The circuitry shown includes also established means of transmitting the power required for the oscillator down the same cable 60 which carries the output signal. This cable 60 can be of indeterminate length, in accordance with established electrical transmission practice.

Thus it will be understood that the frequency of the oscillator and of the transmitted signal in the main output line 60 is controlled by the tuning of the cylindrical capacitor $C_t$ of the transducer which is dependent upon, and determined by, the positioning of the slug 14 and plunger 12. In use, the plunger is connected or coupled through its end part 36 to a member in respect of which it is required to measure or gauge extent of linear displacement in the direction of the axis of the plunger, and it can be arranged so that equal increments or decrements of displacement movement produce equal increments or decrements of frequency such that the transducer has a linear response characteristic. As indicated previously, however, the response characteristic can be modified if desired by adjustment of the wire rings 54 or other control means to provide a controlled degree of asymmetry in the electrostatic field of the cylindrical capacitor $C_t$.

Many modifications in the constructional details of the transducer device can, of course, be made within the scope of this invention, and again, as indicated previously, instead of the vane arrangement provision may be made for modifying and controlling the linearity of the response characteristics by providing a series of screw-threaded radial holes in a portion of the outer electrode of the cylindrical capacitor in which are introduced a selected number of adjustable metal insert screws.

This is indicated in the modified construction illustrated in FIG. 2, wherein like references with a suffix $a$ are used to denote like parts. Thus, instead of aperture 19, portion 18a of the outer cylindrical body is formed with a series of screw-threaded radial holes 70 fitted with screws 71, and the vane 50 is replaced by a small metal disc or flag 72. The control of the capacitance changes and response characteristics is then carried out by selectively screwing in or out these screws 71.

Other modifications shown in FIG. 2 include the provision of the center part 35a of plunger 12a with a middle section 75 composed of compacted iron dust, and compacted iron dust is also incorporated in the sleeve member 22a, whereby displacements of the plunger will cause changes in inductance as well as changes in capacity. Also, the slug member 14a is modified by being provided with parallel strips or bars 77 of P.T.F.E. which are fitted in longitudinal slots in the peripheral surface of the cylindrical slug body and project slightly proud of the latter to provide the guiding and bearing surfaces which engage the cylindrical surface of the bore 16a, instead of using the annular P.T.F.E. sleeve of the first embodiment.

In other modifications for providing the bearing surface for guiding and insulating the slug body within the cylindrical bore, a series of spaced-apart slightly projecting radial insert studs or "pips," again composed of P.T.F.E., may be fitted around the cylindrical periphery either of the bore or of the slug body. In each case, the P.T.F.E. inserts are accurately machined or trued so that their surfaces define or form part of a true cylindrical bearing and guiding surface.

Figure 4:
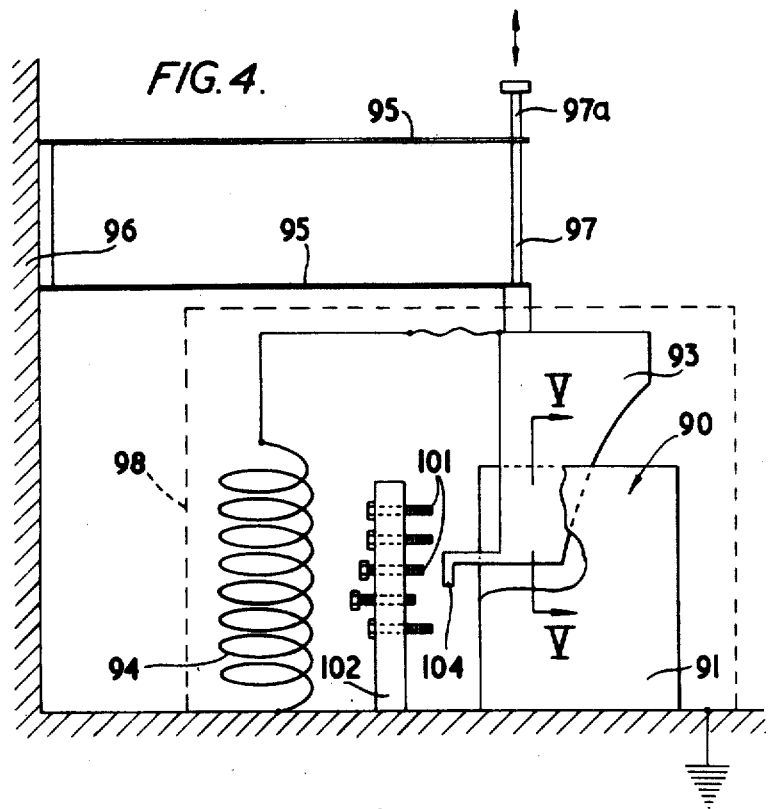
FIG. 4 is a diagrammatic view illustration of a somewhat different form and arrangement of transducer device.
Figure 5:
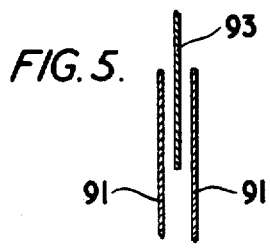
FIG. 5 is a section on line V — V of FIG. 4.

In the further embodiment illustrated diagrammatically in FIGS. 4 and 5, the transducer device includes a parallel plate capacitor 90 having a pair of stationary parallel electrodes 91, 91, between which a center plate electrode 93 is movably mounted and guided for parallel rectilinear movement. As indicated, the movable electrode 93 is carried by a resilient mounting comprising a pair of parallel motion blade springs 95, 95, fixed at their inner ends to a rigid support frame 96.

The electrode 93 is connected to the outer ends of the blade springs 95, 95, through a suitable insulating material and connecting bar 97, and the upper end 97a of the latter may project and be adapted for connection or coupling to the part whose displacement is to be measured. In the case of application to weighing apparatus, however, the assembly of blade springs 95, 95 may form directly the load-balancing component so that the part 97a is adapted to receive the load applied to the apparatus. In any case, the bar 97 and electrode 93 together effectively form the movable mechanical detector or sensing element of the transducer, equivalent to the plunger 37 and slug 14 of the first embodiment.

The electrode 93 is also suitably connected to an inductance coil 94 to make up the requisite tuned circuit of the electrical oscillator, and appropriate electrical screening as indicated by line 98 is provided. Also means for adjusting or controlling the linearity of the transducer frequency change/displacement characteristics may be included which can be similar to that used in the embodiment of FIG. 2, comprising a set of spaced screws 101 provided in a stationary conductive member 102 connected to the electrodes 91, these screws 101 being individually adjustable selectively to vary the position of each, and the distribution of the electrostatic field, relative to the path of movement of an adjacent projecting vane 104 carried by the movable electrode 93.

In this last embodiment, there need be no frictional restraint imposed upon movement of the movable mechanical detector or sensing member, but even in the first-described embodiments, such frictional restraint arising from contact between bearing surfaces can be kept to a very low value so that the device will not impose any appreciable loading upon any apparatus or mechanism to which it is connected.

The fact that the information relating to the degree of displacement is presented as a frequency of electrical oscillation in the output of the transducer has the advantage that the information can readily be transmitted over considerable distances without being subject to errors arising from losses in the transmitted signal as tend to occur with amplitude modulated systems.

Thus, the transducer device and its associated circuitry can feed its output signal down a transmission line of indefinite length and indeterminate characteristics without loss in accuracy of the transmitted information. The output can be fed directly into a timer counter of standard type arranged to display the information relating to the extent of displacement in digital form, or the timer counter may feed a printing device or the like which provides a permanent record of the information.

In another convenient manner of use for displacement measurement, the transducer output may be fed into the input of a radio receiver having a tuning dial calibrated directly in units of length of the equivalent, a dip meter or like device being provided for indicating the resonant setting or "tuning point." It may also be arranged to feed the output into a tuned circuit of variable bandwidth so that coarse and fine measurements can be made according to the bandwidth setting.

To present the information relating to the extent of displacement in terms of a voltage amplitude, the output of the transducer may be fed into a discriminator of conventional type which gives a voltage output proportional to the frequency input.

For radio transmission of the information, the transducer output may, of course, be fed directly into the modulator stage of a standard VHF transmitter used in conjunction with a VHF receiver.

In general, the transducer output may be fed to any suitable form of frequency measuring or indicating means. In another method of providing a visual display, for example, the output could be fed into and gated with a calibrated sweep oscillator of an oscilloscope to produce a pip which will move across the tube axis, which may be calibrated directly in terms of weight or unit length (or round a circle if a circular time base is used). Furthermore, if it is desired to detect the stage at which a particular extent of displacement occurs, the output of the transducer may be fed to any suitable frequency selective detector, or alternatively to the signal input of a frequency changer having a second input derived from a second calibrated oscillator.

Numerous other arrangements of using the device are, however, also possible, and it will be understood that the above-mentioned arrangements are given only by way of example.

Figure 6:
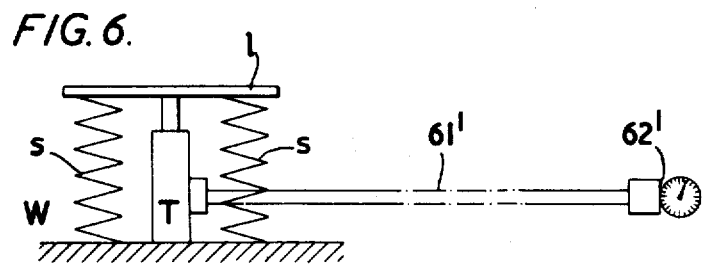
FIG. 6 is a schematic diagram showing the application of the invention to weighing apparatus.

Finally, it may be noted that further advantages which may be obtained by transducer devices as herein described include freedom from fatigue, a very low coefficient of sticktion, very low hysteresis losses and a high stability which is substantially independent of legally permitted variations in supply voltage. And, as previously indicated, the devices can be well-suited for application to many types of weighing apparatus, for gauging the displacement of movable load-responsive members to provide indications of weight measurements. This is illustrated diagrammatically in FIG. 6, wherein W represents the weighing apparatus with load platform $l$ and balancing springs $s$, T represents the transducer device with oscillator circuit $o$ connected through output lines 61' to remotely-positioned counter or frequency meter and associated load indicator unit 62'. Similarly, the devices may also be used effectively with other kinds of apparatus and machine tools, especially when associated with automatic systems.

I claim:

1. Electromechanical transducer apparatus having a movable sensing member, guide means to guide said sensing member for substantially rectilinear movement, an electrical high frequency oscillator including an electromagnetic tuned circuit adapted to provide a high frequency output, said tuned circuit having a variable capacitor component comprising a first capacitor electrode and a relatively-displaceable co-operating second capacitor electrode movable with said sensing member to vary the effective area of overlap of said electrodes and thereby to vary the tuning of said oscillator in accordance with extent of of said sensing member and thereby to vary the frequency of said output according to a predetermined functional relationship wherein a portion of one of said capacitor electrodes is adapted to enable the surface profile thereof to be varied at different positions within an area which is subject to variable overlapping relationship with said other electrode during displacement of the sensing member, thereby to provide means for predetermined fine adjustment of said functional relationship between the change in frequency of the output of the oscillator and said extent of displacement of the sensing member over selected portions of the working range of movement of said sensing member.

2. Electromechanical transducer apparatus according to claim 1, wherein said electrical oscillator has an electromagnetic tuned circuit which determines the frequency of the output and which includes a principal capacitive element and a principal inductive element, at least one of said elements comprising a pair of adjacent cooperating components of which one is carried by said sensing member so as to move therewith and the other component has a relatively stationary location, whereby displacement of said sensing member produces a relative displacement between said adjacent cooperating components which varies the reactance and tuning of said tuned circuit according to a fixed predetermined functional relationship, and wherein said tuned circuit also includes a secondary capacitive element comprising a first electrode which is also carried by said sensing member and an adjacent opposed electrode which is relatively stationary, whereby displacement of said sensing member also produces a relative displacement between said electrodes of the secondary capacitive element which controls the variation of the reactance and tuning of the tuned circuit, the transducer further comprising adjustable means to vary the effective profile of one of said electrodes, thereby selectively controlling the functional relationship between the change in frequency of the oscillator output and the extent of displacement of said sensing member at selected positions within the working range of the latter.

3. Electromechanical transducer apparatus according to claim 1, wherein said electrical oscillator has an electromagnetic tuned circuit which determines the frequency of the output and which includes a principal capacitive element comprising a pair of adjacent opposed electrodes, of which one is carried by said sensing member so as to move therewith and the other is relatively stationary, whereby displacement of said sensing member produces a relative displacement between said electrodes and varies their effective area of overlap and thereby varies the reactance and tuning of said tuned circuit according to the change in capacitance which results from displacement of the sensing member, and wherein the tuned circuit also includes a secondary capacitive element, in parallel with and of substantially smaller capacitance value then said principal capacitive element, comprising a first electrode which is also carried by the sensing member and an adjacent opposed electrode which is relatively stationary, whereby displacement of the sensing member also produces a relative displacement between said electrodes of the secondary capacitive element and alters the capacitance of the latter to control the variation of the reactance and tuning of the tuned circuit, the transducer further comprising adjustable means to vary the effective profile of one of said electrodes of the secondary capacitive element and thereby selectively controlling the functional relationship between the change in frequency of the oscillator output and the extent of displacement of said sensing member, at selected positions within the working range of the latter.

4. Electromechanical transducer apparatus according to claim 3 further comprising a tubular metal housing co-axial with said sensing member which constitutes an axially movable plunger slidably mounted therein, said housing having a first portion which constitutes the relatively stationary electrode of the principal capacitive element and an axially spaced second portion which constitutes the relatively stationary electrode of the secondary capacitive element and wherein said plunger has a first portion which constitutes the movable electrode of the principal capacitive element and an axially spaced second portion which constitutes the movable electrode of the secondary capacitive element, the electrodes of said principal capacitive element and said secondary capacitive element being interconnected electrically in parallel relationship.

5. Electromechanical transducer apparatus according to claim 4, wherein said first portion of the plunger comprises a substantially cylindrical body of electrically conductive material and at least one guiding member consisting of low friction plastics insulating material providing a radially projecting bearing surface of relatively small area in engagement with the cylindrical bore of said housing.

6. Electromechanical transducer apparatus according to claim 4, wherein said second portion of the housing has an apertured part and a plurality of axially-spaced movable electrically conductive segments individually displaceable to extend to a selected extent over said apertured part, thereby altering the effective profile of the latter along the axial direction.

7. Electromechanical transducer apparatus according to claim 6, wherein the electrically conductive segments comprise a series of apertured wire rings rotatably mounted on the housing to be angularly displaceable to selectively partially close said apertured part, and wherein said second portion of the plunger comprises a radially-extending vane having a relatively small electrically conductive surface area which is disposed opposite the apertured part throughout the range of movement of the plunger.

8. Electromechanical transducer apparatus according to claim 4, comprising a set of axially-spaced electrically conductive screw elements carried by said second portion of the housing and extending radially into the bore in a direction transverse to the axial path of movement of said second portion of the plunger, said screws being individually adjustable to vary the effective inner profile of said housing portion.

9. Electromechanical transducer apparatus according to claim 4, wherein the tuned circuit further includes a principal inductive element consisting of a self-contained assembly element fitted within the tubular metal housing and comprising an inductive coil disposed co-axially with the plunger and a magnetic screening sleeve surrounding said coil.

* * * * *